United States Patent [19]

Stevenson

[11] 4,117,619
[45] Oct. 3, 1978

[54] SPRING TIE FISHING SINKER

[76] Inventor: Curtis A. Stevenson, 1424 E. Osborn, #18, Phoenix, Ariz. 85014

[21] Appl. No.: 754,495

[22] Filed: Dec. 27, 1976

[51] Int. Cl.² ............................................. A01K 95/00
[52] U.S. Cl. ..................................... 43/43.1; 43/43.14
[58] Field of Search .................. 43/43.1, 43.14, 44.94, 43/44.95; 24/131 R, 131 C

[56] References Cited

U.S. PATENT DOCUMENTS

| 1,281,958 | 10/1918 | Higgins | 24/131 R |
| 2,227,420 | 1/1941 | Augenblick | 24/131 C |
| 2,981,029 | 4/1961 | Markoff-Moghadam | 43/44.95 |
| 3,456,379 | 7/1969 | Metzger | 43/43.14 |

Primary Examiner—Hugh R. Chamblee
Attorney, Agent, or Firm—Cahill, Sutton & Thomas

[57] ABSTRACT

A weight with an appended coil spring is detachably attachable intermediate a leader and a flexible fishing line by weaving the leader and line with coils of the coil spring in a specific knotless manner that increases the gripping force of the coil spring upon application of a force normally tending to detach the leader and line from the weight.

10 Claims, 5 Drawing Figures

SPRING TIE FISHING SINKER

The present application is related to a patent application entitled "COUPLING DEVICE AND METHOD," Ser. No. 681,801, filed Apr. 30, 1976, and describing an invention of the present inventor.

The present invention relates to weights attachable to a line and, more particularly, to weights detachably attachable to a flexible line without the use of knots.

Fishermen, weather using lures, flies, or hooks, employ weights attached to the line at one or more points in order to weight the bait, to have the bait suspended at a predetermined depth or to provide a particular action to the bait. Additionally, weights are employed at a point along the fishing line substantially removed from the bait in order to obtain a particular action of the bait while trolling.

One of the most commonly used types of weights is that known as split shot; that is, a partially split sphere of lead which is crimped onto the line. Other types of weights which are crimped onto a fishing line include those illustrated in U.S. Pat. Nos. 2,819,555, 3,192,662, and 3,069,802. With this type of a weight attachment mechanism, the fibers of braided line and the surface of monofilament line are often damaged or nicked during either attachment or detachment of the weight. Such damage necessarily reduces the strength of the line and often results in line breaks and loss of the catch. Additionally, the crimped types of weights are somewhat awkward to handle and difficult to reposition along the line.

To ease repositioning of a weight along the line, several types of weighted devices have been developed which allow slipping of the weight along the line in order to optimize the position of the weight. U.S. Pat. Nos. 2,257,415, 2,425,069, 2,957,267, and 3,034,251 illustrate weights of this type.

One of the major problems of these types of weights is that during normal manipulation of the line, the weights often slip inadvertently, and the resulting repositioning of the weights reduces the effectiveness of the bait and fishing technique.

Various weights have been developed which are tied or knotted to a fishing line to avoid both the problems of crimped lines and slipping weights. U.S. Pat. Nos. 188,755, 575,674, and 2,875,551 illustrate weights within this category. As is well known, whenever a knot is introduced onto a line, the strength of the line is diminished by a factor approaching fifty per cent. Additionally, the necessary knotting, when done with cold or frozen hands as is often the case with fisherman, renders attachment very difficult.

U.S. Pat. No. 943,540 illustrates and describes a weight having joined segments of a coil spring mounted upon the ends of a shaft extending from opposed sides of the weight. The weight is attached to a fishing line by engaging the line intermediate coils of each segment and secured in place by the force of the segment acting against the shaft. This weight eliminates the problems of crimped and knotted weights but since only the inherent compressive force intermediate the coil spring and the shaft is relied upon for gripping the line, some slippage does occur and such slippage abrades the line and reduces its strength.

It is therefore a primary object of the present invention to provide a weight readily detachably attachable intermediate a fishing line and a leader.

Another object of the present invention is to provide a detachably attachable fishing line weight which does not damage the fishing line during attachment or detachment.

Still another object of the present invention is to provide a weight having a protruding coil section for engagement with a fishing line.

Yet another object of the present invention is to provide a fishing weight which requires a low degree of manual dexterity during attachment to a flexible fishing line.

A further object of the present invention is to provide a fishing weight having mirror image opposed ends, either of which ends may be attached intermediate a fishing line and a snelled hook.

A still further object of the present invention is to provide a fishing weight which accommodates attachment of a hook and the weight to a fishing line in one operation.

A yet further object of the present invention is to provide a fishing weight which is attachable to a line by a simple wrapping motion of the line about the weight and a protruding coil segment.

These and other objects of the present invention will become apparent to those skilled in the art as the description thereof proceeds.

Figure 1:
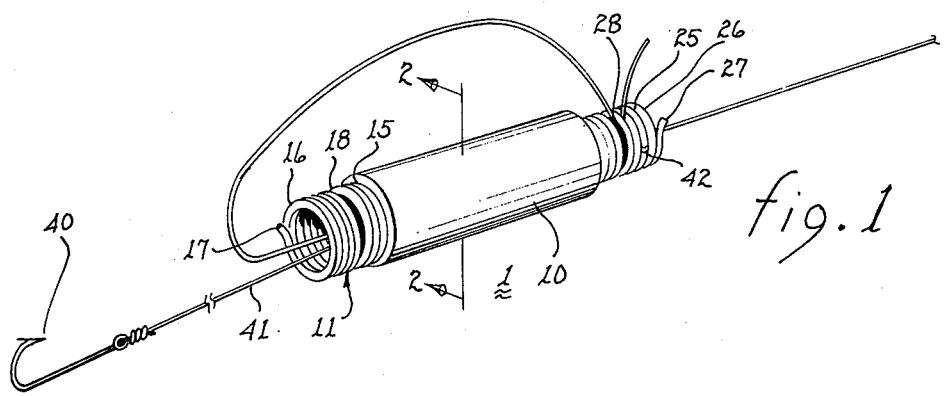
FIG. 1 is a perspective view of the present invention illustrating the mode of attaching a weight intermediate a fishing line and a snelled hook.
Figure 2:
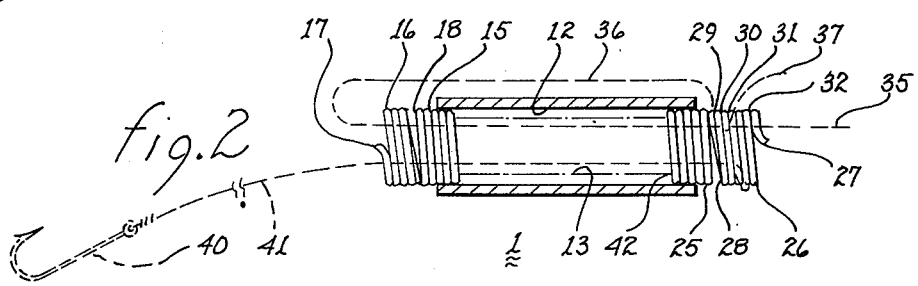
FIG. 2 is a cross sectional view taken along lines 2—2 as shown in FIG. 1.

Referring jointly to FIGS. 1 and 2, weight 1 includes a weight member 10 and a coil spring member 11. The weight member has a channel 12 extending therethrough which may be diametrically sized sufficient to receive and retain spring member 11 therein. As illustrated, the spring member includes spring sections 15 and 25 extending axially from either end of weight member 10. Such extension is preferable, but not mandatory, in order that specific orientation of weight 1 not be necessary when attaching the weight to a line. As is conventional with coil springs, spring member 11 defines a longitudinally oriented cavity 13.

For reasons which will become apparent, spring member 11 may be simply attached to one end of a channeled weight; or, the spring member may be developed from two segregated coil springs extending from opposed ends of a channeled weight.

Spring section 15 includes a plurality of coils biased against one another and terminating at terminal coil 16. End 17 of the wire forming spring section 15, preferably of the type known as "music wire," is bent outwardly from terminal coil 16. Two adjacent ones of the coils of spring section 15 are slightly deformed to develop a gap 18 therebetween. Similarly, spring section 25 includes a plurality of coils terminating at terminal coil 26. End 27 of the wire forming spring section 25 is bent to displace it from the terminal coil. Two adjacent coils are slightly deformed to develop gap 28 therebetween.

To attach weight 1 to a line 35, the end of the line is passed through channel 12 of the weight within cavity 13 defined by the spring member. The line is bent back upon weight member 10 to develop a loop 36. A section close to the end of the line is inserted into gap 28 and wound about spring section 25 in the direction of rotation of the coil. This rotation will result in travel of the end of the line along coils, such as coils 29, 30, and 31, until end piece 37 protrudes one or more coils away from the coil penetrating end of loop 36. End piece 37 is then drawn tight to bring loop 36 into contacting relationship with the exterior surface of weight member 10. It may also be noted that the winding of the end piece results in engagement of line 35 within cavity 13 to draw the line adjacent the inner surface of the coils transgressed by the end piece.

Attachment of line 35 to weight 1 does not require the use of any knots; hence, the diminution of line strength introduced by knots, as is well known, is not present. Instead, nonslipping attachment of the weight is effected by the compressive force exerted by the coils adjacent the ingress and egress points of spring section 25 by end piece 37.

Weight 1 is readily usable intermediate a snelled hook and a line. Normally, a hook 40 includes a leader 41 which has a loop 42 at the end thereof. To attach the snelled hook to weight 1, loop 42 is penetratingly inserted within cavity 13 from the end opposite to that from which line 35 was inserted. The loop is brought into penetrating engagement with end 27 and translated along the succeeding coils until it comes to a coil, such as coil 32. Assuming that weight 1 were already attached to line 35, nothing more need be done.

After attachment of line 35 and leader 41, a pull upon hook 40 and translated along the leader will result in a further bias force of coil 32 adjacent coil 31. This additional bias force between these two coils will tend to more firmly grip the section of loop 42 therebetween and the leader cannot be disengaged from weight 1. Simultaneously, the force exerted upon coil 32 of spring section 25 by a force upon hook 40 will be translated to the pairs of coils gripping the ingress and egress points of end piece 3 and increase the bias or gripping force acting upon the end piece. Thus, divergent forces acting upon hook 40 and line 35 will tend to cause the coils of spring section 25 to more tightly grip the engaged loop and line and preclude separation and the resulting loss of the catch.

By having a spring section disposed at each end of the weight member, the fishermen need not orient the weight in one direction or the other while attaching either the line or the snelled hook. This is of substantial benefit while fishing. It may be further noted that the operation of attaching either a line or a snelled hook, which may be carried out in either order, and except for initial penetration through channel 12, requires only a wrapping of the respective line or leader about the coil section which is readily and easily performed, even by numb and cold hands. Moreover, detachment of weight 1 is readily effected by simply unwrapping the line and/or leader.

Figure 3:
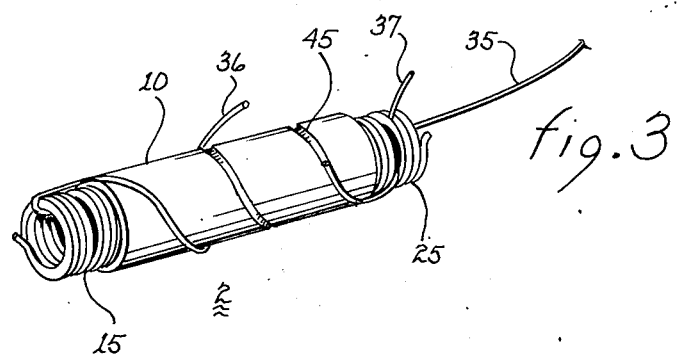
FIG. 3 is a perspective view of a variant of the present invention.

Referring now to FIG. 3, there is shown a variant to the present invention. Weight member 10 may be of the type described above with respect to FIGS. 1 and 2 or a variation thereof, provided only that it include a channel extending therethrough for receiving line 35. Spring sections 15 and 25 may be parts of a common coil spring as described above or only one such section may be attached to one end of weight member 10. The weight member includes a spiral groove 45 disposed within the exterior surface thereof. This groove is configured to receive loop 36 of the line. The means for inserting and locking end piece 37 within spring section 25 is as described above. The purpose of groove 45 is that of providing additional frictional surface area for use in conjunction with lines of extremely low surface friction.

Figure 4:
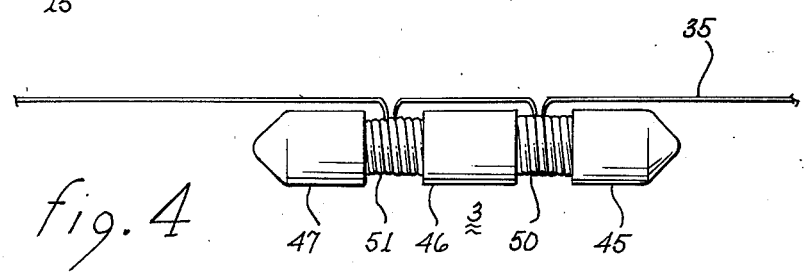
FIG. 4 is a side view of a further variant of the present invention.

FIG. 4 illustrates a further variant 3 of the present invention wherein a substantial amount of weight is to be added in line to a fishing line. Three weight members 45, 46, and 47 are interconnected by spring sections 50 and 51. These spring sections may be segregated or part of a coil spring extending through weight member 46.

To attach variant 3 to line 35, a segment of the line is wrapped tightly about spring section 50 until penetration intermediate two adjacent coils is effected. Thereafter, further wrapping of the segment is performed until one or more coils separate the ingoing and outgoing line segments. A similar wrapping about spring section 51 is performed. To remove variant 3 from line 35, the line is unwrapped from about the engaged spring sections.

Because of the bias extant between adjacent coils of the spring sections, line 35 will be frictionally locked by the spring sections. Were the weight members of variant 3 subjected to an external force which might tend to cause slippage of variant 3 along line 35, such slippage is effectively countered by the same force acting upon the weight members in such a manner as to more tightly compress the intermediate spring sections and increase the frictional lock acting upon the line.

Figure 5:
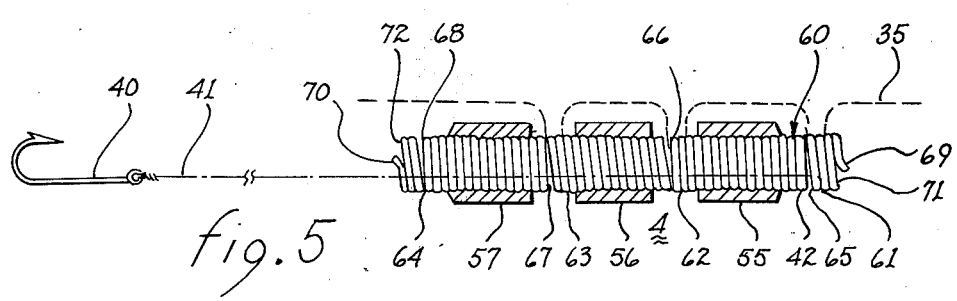
FIG. 5 is a cross sectional view of still another variant of the present invention.

FIG. 5 illustrates a yet further variant 4 which incorporates several of the features of weight 1 shown in FIGS. 1 and 2 and variant 3 shown in FIG. 4. A length of coil spring 60 has a plurality of circumscribing segregated weight members 55, 56, and 57 disposed thereon. The resulting segregated spring sections 61, 62, 63, and 64 are disposed at the ends of the weight members. Gaps 65, 66, 67, and 68 are developed within each of spring sections 61, 62, 63, and 64, respectively, by slightly deforming adjacent coils within each of the spring sections. Ends 69 and 70 of terminal coils 71 and 72 of coil spring 60 are bent outwardly to simplify coil engagement by a loop in the line. A line, such as line 35 shown in phantom, is attached to one or more of the spring sections; that is, a segment of the line is inserted into the respective one of the gaps and wrapped about the respective spring section until one or more coils separate the ingoing and outgoing line segments. Similarly, a hook 40 attached to a leader 41 with a loop 42 is secured to variant 4 by inserting the loop through the coil spring and threading end 69 and at least terminal coil 71 through the loop. Thereby, the loop is frictionally retained intermediate adjacent coils.

It is to be understood that variant 4 may also be employed as a weight disposed intermediate the end of line 35 and a snelled hook rather than as an in-line weight. Where the latter use of variant 4 is to be made, line 35 may be looped around the variant in the manner shown in FIG. 1 or the line may be looped around individual weight members with engagement of one or more coils intermediate each of the weight members.

As may become apparent from the above description and FIG. 5, variant 4, like the preceding variants, require no knotting of the line for attachment and only a simple wrapping motion of the line is necessary. This type of motion is readily performed in the field with or without the benefit of light and whether or not one's hands are too numb to tie a knot.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A detachable weighted coupling device for connecting the loop of a leader to a fishing line, said device comprising in combination:
   a. weight means having a channel extending therethrough;
   b. a tightly wound coil spring section extending from said weight means in proximity to at least one end of the channel, said coil spring section defining a cavity in communication with the channel;
   c. terminal coil means of said coil spring section for engaging the loop of the leader inserted through the channel and the cavity; and
   d. further coil means of said coil section disposed intermediate said terminal coil and said weight means for gripping the fishing line threaded into and out of said further coil means;
   whereby, the gripping force of said coil spring section is increased proportionally to opposing forces applied to the leader and the fishing line.

2. The device as set forth in claim 1 including a further tightly wound coil spring section extending from said weight means in proximity to another end of said channel.

3. The device as set forth in claim 2 wherein said coil spring section and said further coil spring section are parts of a coil spring disposed within and extending through said channel.

4. The device as set forth in claim 3 wherein said weight means comprises a sleeve.

5. The device as set forth in claim 4 and including a spiral groove disposed about said sleeve.

6. The device as set forth in claim 1 wherein said further coil means includes a gap intermediate a pair of adjacent coils for receiving the fishing line.

7. The device as set forth in claim 1 wherein said coil spring section comprises a coil spring and said weight means comprises a plurality of weight members disposed in spaced apart relationship along said coil spring.

8. The device as set forth in claim 7 wherein said coil spring comprises a gap disposed within each exposed segment of said coil spring.

9. A method for detachably attaching a looped leader to a fishing line with a channeled weighted member having a coil spring section attached to the weight member in communication with one end of the channel, said method comprising the steps of:
   a. inserting the looped leader serially through the channel of the weight and through the coil spring section;
   b. threading at least one coil of the coil spring section through the loop of the leader;
   c. pushing the end of the fishing line serially through the coil spring section and the channel of the weight;
   d. folding the end of the fishing line back over the weight;
   e. applying a force to the end of the fishing line to insert a segment of the fishing line intermediate adjacent coils of the coil spring section intermediate the weight and the loop engaged coil;
   f. wrapping the end of the fishing line about the coil spring section for at least one revolution in the direction of rotation of the coil spring section; and
   g. drawing the line tight to bring a segment of the end of the fishing line interior to the coil spring section into contacting relationship with the interior surface of the coil spring section;
   whereby, opposing forces exerted upon the leader and the fishing line tend to compress the coil spring section axially and exert a greater gripping force upon the engaged loop and fishing line.

10. A method as claimed in claim 9 wherein steps a-b are performed subsequent to step g.

* * * * *